(12) United States Patent
Siomina et al.

(10) Patent No.: US 9,775,122 B2
(45) Date of Patent: Sep. 26, 2017

(54) TRANSMIT CONFIGURATION ADAPTATION FOR DEVICE TO DEVICE COMMUNICATIONS BASED ON TIMING MEASUREMENTS

(71) Applicant: Telefonaktiebolaget LM Ericsson (publ), Stockholm (SE)

(72) Inventors: Iana Siomina, Täby (SE); Gabor Fodor, Hässelby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/117,257

(22) PCT Filed: May 6, 2014

(86) PCT No.: PCT/SE2014/050549
§ 371 (c)(1),
(2) Date: Aug. 8, 2016

(87) PCT Pub. No.: WO2015/119546
PCT Pub. Date: Aug. 13, 2015

(65) Prior Publication Data
US 2017/0006560 A1   Jan. 5, 2017

Related U.S. Application Data

(60) Provisional application No. 61/937,866, filed on Feb. 10, 2014.

(51) Int. Cl.
*H04B 7/00* (2006.01)
*H04W 52/38* (2009.01)
(Continued)

(52) U.S. Cl.
CPC ......... *H04W 52/383* (2013.01); *H04W 8/005* (2013.01); *H04W 52/246* (2013.01);
(Continued)

(58) Field of Classification Search
USPC .......... 455/522, 69–70, 502, 509, 41.1–41.3; 370/310–320
See application file for complete search history.

(56) References Cited

U.S. PATENT DOCUMENTS

| | | | |
|---|---|---|---|
| 2006/0245398 A1* | 11/2006 | Li | H04B 7/2668 370/335 |
| 2007/0097900 A1* | 5/2007 | Kim | H04W 52/283 370/318 |

(Continued)

FOREIGN PATENT DOCUMENTS

| | | |
|---|---|---|
| WO | WO 2010/035100 A1 | 4/2010 |
| WO | WO 2010/108549 A1 | 9/2010 |

OTHER PUBLICATIONS

International Search Report, Application No. PCT/SE2014/050549, dated Jul. 17, 2014.

(Continued)

*Primary Examiner* — Fayyaz Alam
(74) *Attorney, Agent, or Firm* — Sage Patent Group

(57) ABSTRACT

A method by a first network node is disclosed for adapting transmit configuration of a first user equipment for communications directly to a second UE. The first network node obtains a first timing measurement between the first UE and the first network node. A second timing measurement between the second UE and a second network node is obtained by the first network node. A transmit configuration of a wireless communication from the first UE directly to the second UE is adapted by the first network node based on the first timing measurement and the second timing measurement. Related network nodes, methods by user equipment, and user equipments are disclosed.

30 Claims, 10 Drawing Sheets

(51) Int. Cl.
    *H04W 52/28*     (2009.01)
    *H04W 52/50*     (2009.01)
    *H04W 56/00*     (2009.01)
    *H04W 72/04*     (2009.01)
    *H04W 8/00*     (2009.01)
    *H04W 76/02*     (2009.01)
    *H04W 52/22*     (2009.01)
    *H04W 52/24*     (2009.01)
    *H04W 52/36*     (2009.01)
    *H04W 72/08*     (2009.01)

(52) U.S. Cl.
    CPC ....... *H04W 52/247* (2013.01); *H04W 52/248* (2013.01); *H04W 52/283* (2013.01); *H04W 52/50* (2013.01); *H04W 56/0045* (2013.01); *H04W 72/042* (2013.01); *H04W 76/023* (2013.01); *H04W 52/226* (2013.01); *H04W 52/242* (2013.01); *H04W 52/367* (2013.01); *H04W 52/386* (2013.01); *H04W 72/085* (2013.01)

(56) References Cited

U.S. PATENT DOCUMENTS

2011/0182280 A1*   7/2011   Charbit ............. H04W 56/0045
                                                                                                 370/350
2012/0258706 A1*   10/2012   Yu ..................... H04W 56/0045
                                                                                                 455/426.1

OTHER PUBLICATIONS

Written Opinion of the International Searching Authority, Application No. PCT/SE2014/050549, dated Jul. 17, 2014.

* cited by examiner

TRANSMIT CONFIGURATION ADAPTATION FOR DEVICE TO DEVICE COMMUNICATIONS BASED ON TIMING MEASUREMENTS

CROSS REFERENCE TO RELATED APPLICATIONS

This application is a 35 U.S.C. §371 national stage application of PCT International Application No. PCT/SE2014/050549, filed on May 6, 2014, which itself claims the benefit of U.S. provisional Patent Application No. 61/937,866, filed Feb. 10, 2014, the disclosure and content of both of which are incorporated by reference herein in their entireties. The above-referenced PCT International Application was published in the English language as International Publication No. WO 2015/119546 A1 on Aug. 13, 2015.

TECHNICAL FIELD

The present invention relates to wireless communication systems and more particular to device-to-device communications.

BACKGROUND

If wireless communication devices, e.g., user equipment devices (UEs), are proximately located to each other, they may be able to use a "direct mode" path for data communications through a link directly between them without routing of the communications through any eNodeB, signalling gateway (SGW)/packet data network gateway (PGW), or other network node, e.g., shown in FIG. 1. Proximately located communication devices may alternative have their communications "locally-routed" through a shared eNodeB or other network node, e.g., shown in FIG. 2. In conventional cellular communications between devices, the device communications are routed through one or more eNodeB(s) and SGW/PGW, e.g., shown in FIG. 3.

In device-to-device (D2D) communication, the source and the target devices are wireless devices, e.g., UEs, that communicate directly between each other through wireless links without relay through another UE or network node. Some of the potential advantages of D2D communication are off-loading traffic that would other pass through the cellular network, faster communication, lower latency communication, increased awareness of surrounding wireless devices of interest, e.g., which are running the same application, higher-quality links due to a shorter distance directly between the D2D devices, etc. Some appealing applications of D2D communications are video streaming, online gaming, media downloading, peer-to-peer (P2P), file sharing, etc.

A more detailed example reference system architecture for D2D operation is illustrated in FIG. 4. The system includes two UEs, Proximity Services (ProSe) applications performed by the UEs to provide D2D communication functionality, an Evolved-Universal Terrestrial Radio Access Network (E-UTRAN) node that provides cellular communication services to the UEs, an Evolved Packet Core (EPC) node, a ProSe function performed by a network node to setup and control D2D communications between the UEs, and a ProSe application server.

Currently, in some D2D communication the communicating devices always transmit at full power. Such full power transmissions introduce high interference to other communicating devices and network nodes. Some other D2D communicating devices iteratively adapt their transmit power based on measurements of path losses between the devices. Unfortunately, in practice not much information is available about the path losses between devices involved in D2D communication and such iterative approaches can be slow to adapt transmit power.

In LTE, uplink (UL) power control controls the transmit power of the different UL physical channels to ensure that a desired quality is achieved at the serving BS receiver. In Evolved-Universal Terrestrial Radio Access Network (E-UTRAN) the UL power control has both open loop components and closed loop components. The open loop UL power control is derived by the UE in every subframe based on the network-signaled parameters and estimated path loss or path gain. The closed loop UL power control is governed primarily by the transmit power control commands sent in each subframe (i.e. active subframe where transmission takes place) to the UE by the network. This causes the UE to control its transmission power based on both open loop estimation and Transmit Power Control (TPC) commands. This power control approach can be used for Physical Uplink Shared Channel (PUSCH), Physical Uplink Control Channel (PUCCH) and Sounding Reference Signal (SRS). The uplink transmitted power for RACH transmission is only based on the open loop component, i.e. path loss and network signaled parameters.

In general, the UL power control in E-UTRAN may be described as $$P_{X,c}(i) = \min\{P_{CMAX,c}(i), F(\gamma_1, \gamma_2, \gamma_3, \ldots)\},$$

where $P_{X,c}(i)$ is the UE UL transmit power on channel/signal X in serving cell c in subframe i, $P_{CMAX,c}(i)$ is the configured UE transmit power defined in subframe i for serving cell c, and $F(\gamma_1, \gamma_2, \gamma_3, \ldots)$ is a function of multiple parameters (including path loss) which are specific for the channel/signal X, e.g., PUSCH, PUCCH, SRS, Physical Random Access Channel (PRACH).

Known approaches are typically pathloss-based, which are difficult to adapt for use in D2D communication since the pathloss between UEs and eNodeBs is difficult to use to estimate pathloss directly between two UEs, particularly in view of the common use of directed antennas and non-uniform antenna gains which affect pathloss. These approaches utilize an iterative approach for transmit power control, e.g., based on measuring total interference from environment, received signal strength, etc., that if adapted to D2D communications can require an unsatisfactory long time to constrain excessively high power D2D transmissions and during which time undesirable interference can be caused to other network nodes and/or UEs. Moreover, these approaches are not designed to power-control a transmitter for D2D when the two UEs are located in different cells. These approaches may also be more directed to point-to-point power control.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

Some embodiments of the present disclosure are directed to a method by a first network node for adapting transmit configuration of a first user equipment (UE) for communications directly to a second UE. The method includes obtaining a first timing measurement between the first UE and the first network node, and obtaining a second timing measurement between the second UE and a second network node. The method further includes adapting a transmit configuration of a wireless communication from the first UE directly to the second UE based on the first timing measurement and the second timing measurement.

A potential advantage of this approach is that the transmit configuration of the first UE can be quickly adapted based on the timing measurements without requiring knowledge of pathloss between the UEs. The initial transmit power level of the first UE may be constrained based on the transmitter configuration when initially transmitting to the second UE, which can avoid the first UE initially transmitting to the second UE at an excessive transmit power level that unnecessarily interferes with other UEs and network nodes.

Some other embodiments of the present disclosure are directed to a method by a first UE for adapting transmit configuration for communications directly to a second UE. The method includes obtaining a first timing measurement between the first UE and a first network node, and obtaining a second timing measurement between a second UE and a second network node. The method further includes adapting a transmit configuration of a wireless communication from the first UE directly to the second UE based on the first timing measurement and the second timing measurement.

Some other embodiments are directed to a first network node for adapting a transmit configuration of a first UE for communications directly to a second UE. The first network node includes a processor and a memory coupled to processor. The memory includes computer readable program code that when executed by the processor causes the processor to perform operations that include obtaining a first timing measurement between the first UE and the first network node, and obtaining a second timing measurement between the second UE and a second network node. The operations further include adapting a transmit configuration of a wireless communication from the first UE directly to the second UE based on the first timing measurement and the second timing measurement.

Some other embodiments are directed to a first UE for adapting a transmit configuration for communications directly to a second UE. The first UE includes a processor and a memory coupled to the processor. The memory includes computer readable program code that when executed by the processor causes the processor to perform operations that include obtaining a first timing measurement between the first UE and a first network node, and obtaining a second timing measurement between the second UE and a second network node. The operations further include adapting a transmit configuration of a wireless communication from the first UE directly to the second UE based on the first timing measurement and the second timing measurement.

Other methods, UEs, and network nodes according to embodiments of the invention will be or become apparent to one with skill in the art upon review of the following drawings and detailed description. It is intended that all such additional methods, UEs, and network nodes be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

Aspects of the present disclosure are illustrated by way of example and are not limited by the accompanying drawings. In the drawings.

DETAILED DESCRIPTION

In the following detailed description, numerous specific details are set forth in order to provide a thorough understanding of embodiments of the invention. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Some embodiments of the present disclosure are directed to methods of adapting a transmit configuration, e.g., transmit power, transmit resource allocation scheme, resource allocation method, transmit mode, and/or transmit antenna, of one UE1 to support a D2D service/operation for another UE2, e.g., D2D broadcast communication, D2D group communication, D2D unicast communication, or D2D discovery.

In one embodiment, the methods include:
performing a first timing measurement, e.g., timing advance, UE Rx-Tx, eNodeB Rx-Tx, Round Trip Time (RTT), time of arrival, and/or propagation delay, which is associated with UE1 and a first radio network node, and performing at least one second timing measurement, e.g., timing advance, UE Rx-Tx, eNodeB Rx-Tx, RTT, time of arrival, and/or propagation delay, which is associated with a UE2 and a second radio network node.

The methods may be implemented in one or more of: UE1, the first radio network node, a controlling node.

Figure 8:
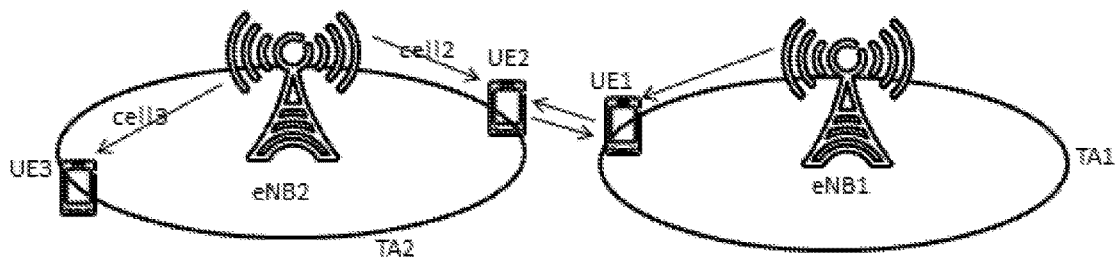
Figure 9:
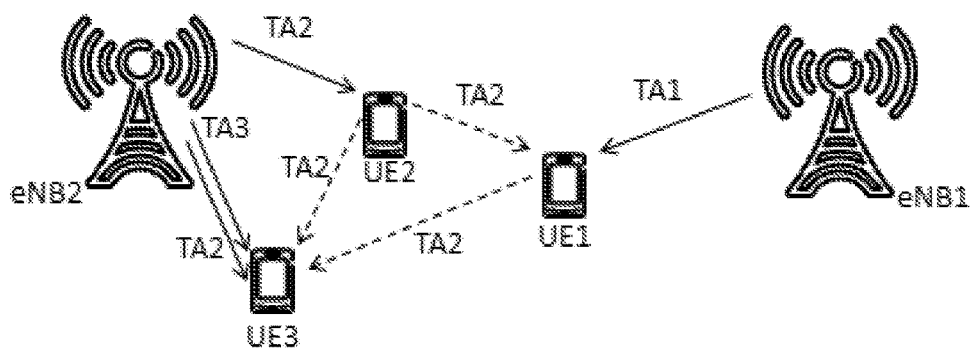
Figure 10:
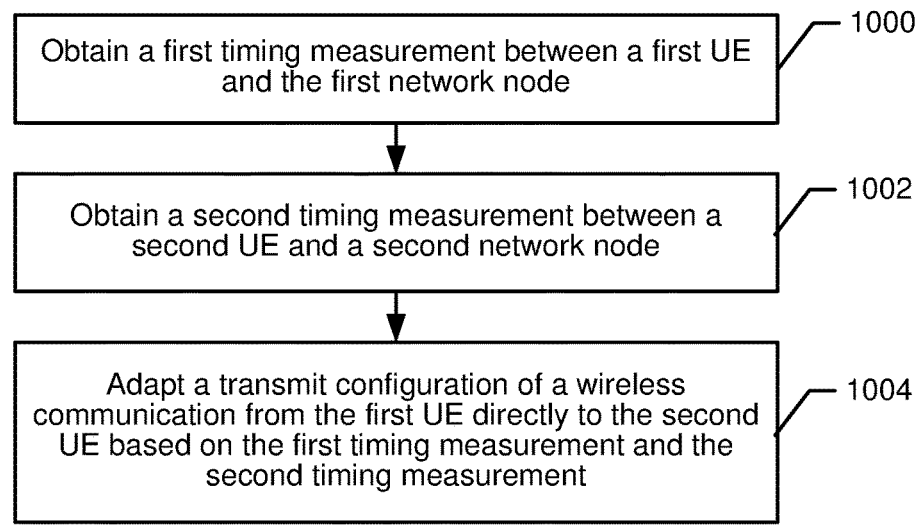
FIGS. 10-14 illustrate operations and methods that can be performed by a network node to adapt a transmit configuration used for D2D operation between UEs according to some embodiments.

FIG. 10 illustrates a flowchart of operations and methods by a first network node, e.g., eNB1 of FIGS. 5-9, for adapting transmit configuration of a first UE, such as UE1 of FIGS. 5-9, for communications directly to a second UE, such as UE2 of FIGS. 5-9. Referring to FIG. 10, the operations and methods include obtaining (block 1000) a first timing measurement between the first UE (UE1) and the first network node (eNB1), and obtaining (block 1002) a second timing measurement between the second UE (UE2) and a second network node (eNB2). The operations and methods further include adapting (block 1004) a transmit configuration of a wireless communication from the first UE (UE1) directly to the second UE (UE2) based on the first timing measurement and the second timing measurement.

Figure 19:
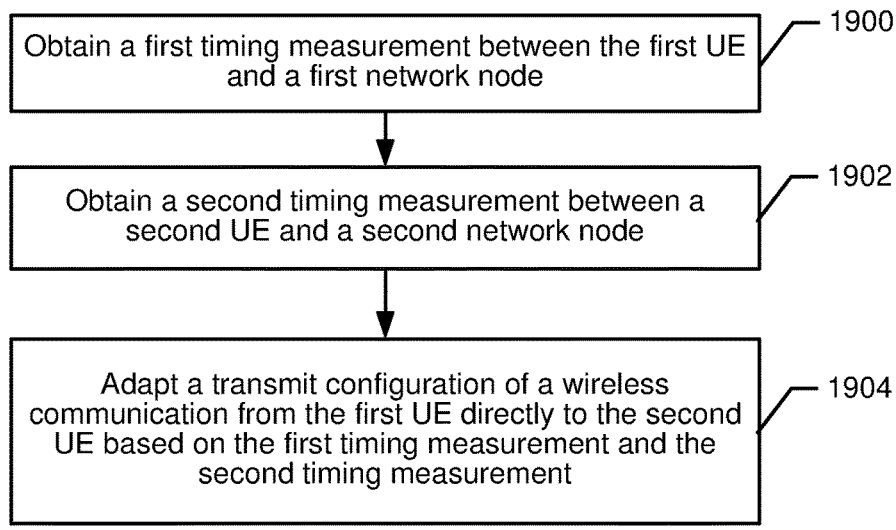
FIG. 19-28 illustrate operations and methods that can be performed by a UE to adapt a transmit configuration used for D2D operation with another UE according to some embodiments.

FIG. 19 illustrates a flowchart of operations and methods by a first UE, such as UE1 of FIGS. 5-9, for adapting transmit configuration for communications directly to a second UE, such as UE2 of FIGS. 5-9. Referring to FIG. 19, the operations and methods include obtaining (block 1900) a first timing measurement between the first UE (UE1) and a first network node (eNB1), and obtaining (block 1902) a second timing measurement between a second UE (UE2) and a second network node (eNB2). The operations and methods further include adapting (block 1904) a transmit configuration of a wireless communication from the first UE (UE1) directly to the second UE (UE2) based on the first timing measurement and the second timing measurement.

A potential advantage of this approach is that the transmit configuration of the first UE can be quickly adapted based on the timing measurements without requiring knowledge of pathloss between the UEs. The initial transmit power level of the first UE may be constrained based on the transmitter configuration when initially transmitting to the second UE, which can avoid the first UE initially transmitting to the second UE at an excessive transmit power level that unnecessarily interferes with other UEs and network nodes.

As explained herein, one or both of the timing measurements may be obtained based on a timing advance value communicated to respective first and second UEs (UE1 and UE2), a transmission propagation time from the first UE (UE1) to the first network node (eNB1), a transmission propagation delay from the first network node (eNB1) to the first UE (UE1), a round-trip transmission propagation delay, and a time of arrival measurement.

In one embodiment, the first radio network node is a serving node of UE1, and the second radio network node is a serving node of UE2. Note also that more than one serving cell (or even serving nodes) may exist for a UE, e.g., in carrier aggregation.

The transmit configuration, such as transmit power, adaptation may be utilized to control the coverage range of UE1 for D2D, to reduce pilot pollution in the network, such as when one receiver may observe too many transmitting UEs eligible for D2D, to reduce unnecessary interference in the network, etc. The transmit configuration, such as transmit power, adaptation may also reduce power consumption in UE1.

The transmit configuration, such as transmit power, may be adapted to control an initial transmit (transmission) power level that UE1 uses to initially communicate directly with UE2 in D2D. UE1 may thereafter adapt its transmit power configuration based on open loop and/or closed loop power control processes that may include UE2 signalled parameters received by UE1, such as received signal strength, estimated path loss or path gain from UE1 to UE2 and/or vice versa, transmit power control commands sent by UE2 to UE1, etc.

Abbreviations and Generalized Terms

Device-to-device (D2D). In some examples, the terms 'D2D' and 'proximity service' (ProSe) may be used interchangeably.

A D2D device is also referred to herein as a UE. A D2D device may comprise any communication device (entity) capable of at least receiving or transmitting radio signals on a direct radio link, i.e., communicating directly between one device and another D2D capable device without relay through a network node or other device. A D2D-capable device or UE may also be comprised in a cellular UE, PDA, a wireless device, laptop, mobile, sensor, relay, D2D relay, or even a small base station employing a UE-like interface, etc.

D2D transmission is any transmission by a D2D device. Some examples of D2D transmission are physical signals or physical channels, dedicated or common/shared, e.g., reference signal, synchronization signal, control channel, data channel, broadcast channel, and/or paging channel. A D2D transmission on a direct radio link is intended for receiving by another D2D device. A D2D transmission may be a unicast, group cast, or broadcast transmission.

A coordinating node is a node that schedules, decides, at least in part, or selects time-frequency resources to be used for at least one of: cellular transmissions and D2D transmissions. The coordinating node may also provide the scheduling information to another node such as another D2D device, a cluster head, a radio network node such as eNodeB, or a network node, e.g. a core network node. The coordinating node may communicate with a radio network node.

Radio spectrum: Although at least some of the embodiments are described for D2D transmissions in the UL spectrum (FDD) or UL resources (TDD), the embodiments are not limited to the usage of UL radio resources, neither to licensed or unlicensed spectrum, or any specific spectrum at all.

A cellular network may comprise, for example, an LTE network (FDD or TDD), UTRA network, CDMA network, WiMAX, GSM network, or any network employing any one or more radio access technologies (RATs) for cellular operation. Although various embodiments are described herein in the context of a LTE network, these and other embodiments are not limited to the LTE Radio Access Technology (RAT).

Example RATs that various embodiments disclosed herein may use can include, but are not limited to, LTE, GSM, CDMA, WCDMA, WiFi, WLAN, WiMAX, etc.

The network node may be a radio network node or another network node. Some examples of the radio network node are a radio base station, a relay node, an access point, a cluster head, RNC, etc. The radio network node is included in a wireless communication network and may also support cellular operation. Some examples of a network node which is not a radio network node: a core network node, MME, a node controlling at least in part mobility of a wireless device, SON node, O&M node, positioning node, a server, an application server, a D2D server (which may be capable of some but not all D2D-related features), an external node, or a node comprised in another network.

The embodiments described herein may be combined with each other in any way.

Methods and Operations for Adapting Transmit Power of a D2D UE Based on Timing Measurements In this section, methods and operations for adapting transmit power of a D2D UE, referred to as UE1 hereafter, are described, wherein the adapted transmit power level is used for transmitting one or more radio signals or channels related to D2D, e.g., D2D synchronization signal, D2D synchronization channel, beacon, D2D control channel, D2D data channel, D2D shared channel, a D2D-related radio signal, a discovery signal, and/or a radio signal used for D2D communication.

One embodiment includes adapting transmit power of a first UE, such as UE1 of FIGS. 5-9, for transmitting at least one D2D-related radio signal or channel to a second UE, such as UE2 of FIGS. 5-9, based at least on:

1) a first timing measurement, e.g., timing advance, UE Rx-Tx, eNodeB Rx-Tx, Round Trip Time (RTT), time of arrival, and/or propagation delay, which is associated with UE1 and a first radio network node, e.g., eNB1 of FIGS. 5-9, and
2) at least one second timing measurement, e.g., timing advance, UE Rx-Tx, eNodeB Rx-Tx, RTT, time of arrival, and/or propagation delay, which is associated with the second UE, such as UE2 of FIGS. 5-9, and a second radio network node, such as eNB2 of FIGS. 5-9;

The first timing measurement may or may not be performed on the same frequency, frequency band, or RAT as the frequency/frequency band/RAT used for the UE1 transmission at the adapted transmit power level.

The second timing measurement may or may not be performed on the same frequency, frequency band, or RAT as the frequency/frequency band/RAT used for the UE1 transmission at the adapted transmit power level.

When the first UE (UE1) is transmitting data to more UEs than UE2, e.g., UE3, UE4 ... $UE_N$, then a function of the corresponding associated timing measurements may be used instead to adapt the transmit configuration, e.g., transmit power, of the first UE. The function may be 'min( ..., ..., ... )', 'max( ..., ..., ... )', X-percentile of UEs, 'mean( ..., ..., ... )', etc. More generally, additional timing measurements can be obtained between each of the additional UEs, e.g., UE3, UE4 ... $UE_N$, and the radio networks nodes they respectively communicate with, and the transmit configuration, e.g., transmit power, of the first UE can be adapted based on some or all of the additional timing measurements. The additional timing measurements may be mathematically combined, e.g., mean, to generate a value that is used to adapt the transmit configuration of the first UE and/or a selection can be made among the additional timing measurements, e.g., select based on the minimum timing value and/or select based on maximum timing value, for use to adapt the transmit configuration of the first UE.

Figure 1:
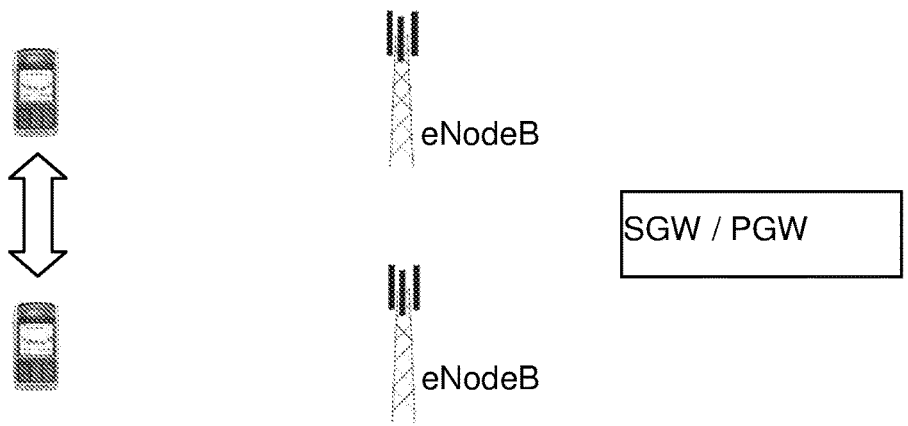
FIG. 1 illustrates a "direct mode" data path in an Evolved Packet System (EPS) for communication between two User Equipments (UEs)
Figure 2:
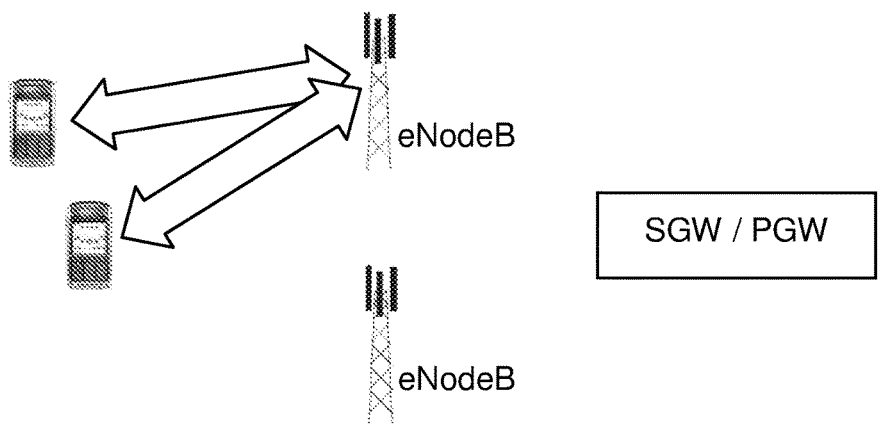
FIG. 2 illustrates a "locally-routed" data path in the EPS for communication between two UEs when UEs are served by the same eNBs.
Figure 3:
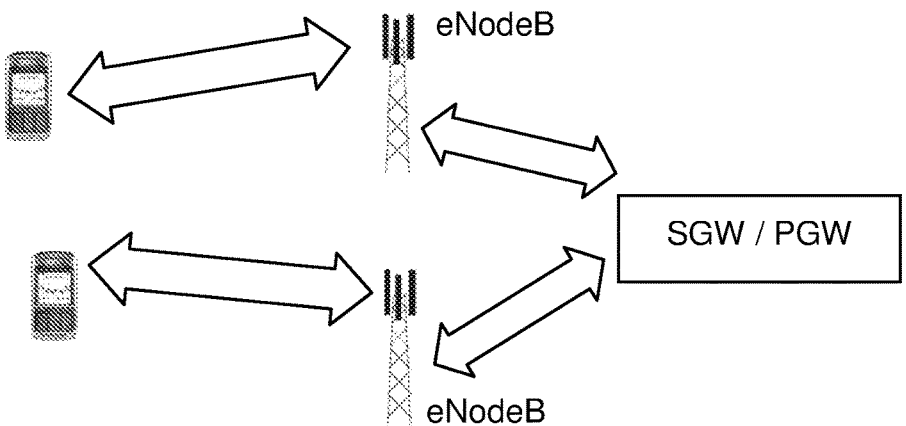
FIG. 3 illustrates a default data path scenario in the EPS for cellular communication between two UEs.
Figure 4:
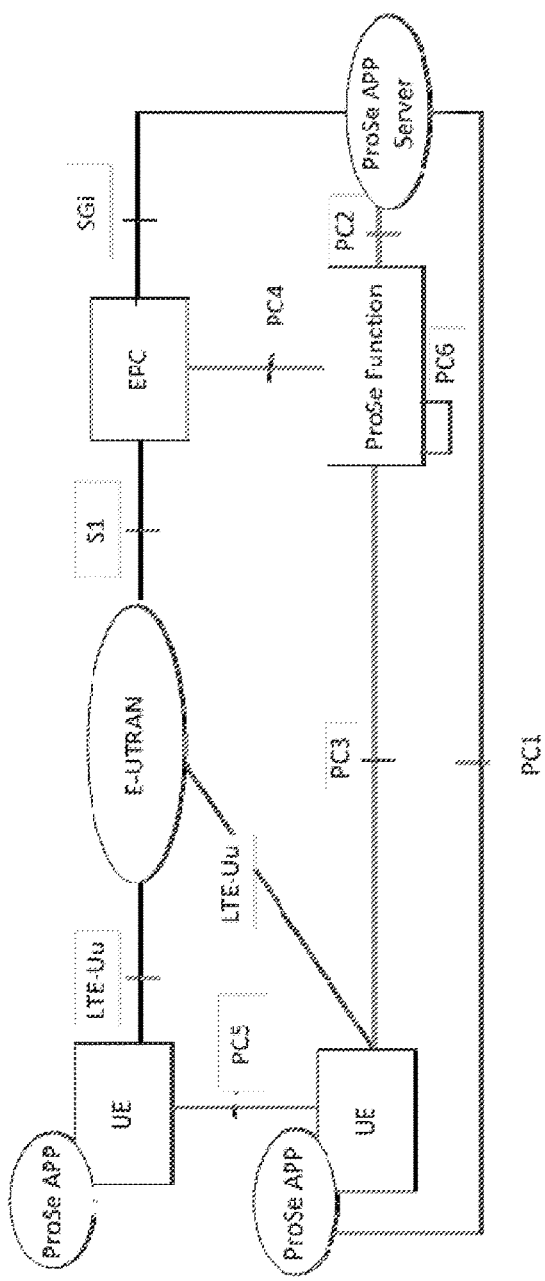
FIG. 4 illustrates a reference Evolved Packet System architecture for D2D operation.
Figure 5:
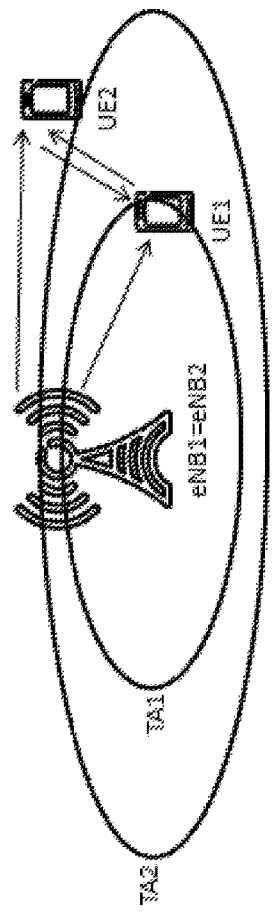
FIGS. 5-9 illustrate communication scenarios between UEs and one or more eNBs according to some embodiments.
Figure 6:
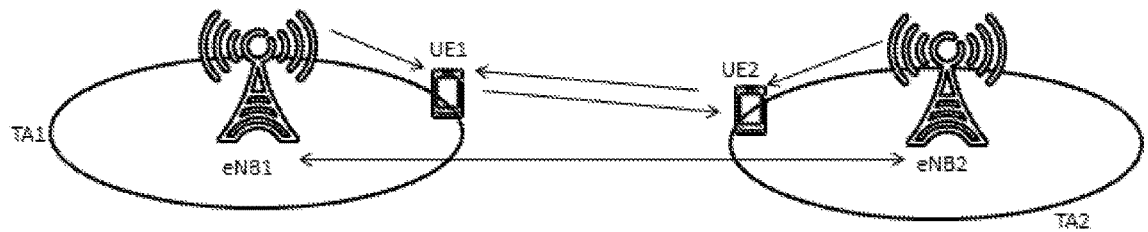
Figure 7:
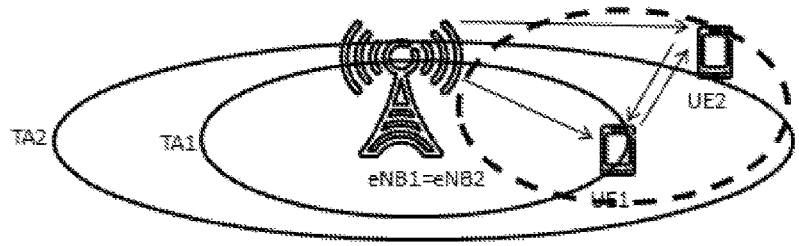

FIGS. 5-9 illustrate communication scenarios between a plurality of UEs and one or more network nodes, e.g., eNBs. The phrases first network node and second network node used herein can refer to a same network node. For example, as illustrated in FIGS. 5 and 7, the first network node (eNB1) is the same as the second network node (eNB2). In contrast, the phrases first UE and second UE used herein refer to different UEs, e.g., UE1 is not the same as UE2.

In the communication scenario of FIG. 5, the first radio network node (eNB1) is the same as the second radio network node (eNB2), such as by having the same circuitry or collocated circuitry. TA1 is a timing measurement, e.g., timing advance, reflecting the distance between a first UE (UE1) and eNB1. TA2 is a timing measurement, e.g., timing advance, reflecting the distance between a second UE (UE2) and eNB2.

In the communication scenario of FIG. 6, the first radio network node (eNB1) and the second radio network node (eNB2) are different and spaced apart. TA1 is a timing measurement, e.g., timing advance, reflecting the distance between UE1 and eNB1. TA2 is a timing measurement, e.g., timing advance, reflecting the distance between UE2 and eNB2.

In the communication scenario of FIG. 7, the first radio network node (eNB1) is the same as the second radio network node (eNB2), the first and second UEs (UE1 and UE2) are also in the same cell portion of a cell (the cell may or may not be an omni cell, i.e., it may be served by a directional antenna too). TA1 is a timing measurement, e.g., timing advance, reflecting the distance between UE1 and eNB1. TA2 is a timing measurement, e.g., timing advance, reflecting the distance between UE2 and eNB2.

In the communication scenario of FIG. 8, UE1 and UE2 are in proximity of each other (within D2D communication range of each other) and therefore they may not need to transmit at full power while performing D2D communication between them. However, UE1 and a third UE (UE3) are not in proximity to each other, even though UE2 and UE3 have the same or similar TA. This is because the cell of UE1 and the cell of UE3 are not direct neighbours.

The communication scenario of FIG. 9 obtains first and second timing measurements, e.g., timing advance (TA), according to the following operations and methods:
(a) UE1 served by eNB1 obtains its TA1 from eNB1 via a cellular link and it obtains TA2 of UE2 served by eNB2 via a D2D link; and
(b) UE3 served by eNB2 obtains its TA3 from eNB2 and it obtains TA2 of UE2 via a D2D link from UE2 or from UE1 or via a cellular link from eNB2 (dedicated or broadcast).

The D2D links in FIG. 9 are represented by dashed lines. UE2 may be a unicast, multicast or broadcast D2D transmitter.

In a further example, UE1 may be a broadcast or multicast UE. In another example, UE1 may have a unicast transmission to UE2. UE1 may also be adapting its transmit power in response to a need to respond to UE2 (e.g., upon receiving a transmission from UE2, the UE1 transmits but with an adapted transmit power) or based on a feedback from UE2. In another further example, the D2D-related radio signal/channel may be a broadcast/multicast/unicast radio signal or channel (e.g., a physical signal such as a reference signal or synchronization signal configured/used for D2D purpose, a common or a dedicated data channel or a control channel), which may be transmitted in the uplink spectrum but not necessarily.

More specifically, the methods and operations performed by a first network node and/or by a first UE, e.g., UE1, according to some embodiments can include the steps of:

1. Obtaining the first timing measurement,
    In some example embodiments, the first timing measurement may be obtained by carrying out one or more of: Performing the measurement, e.g., UE1 measures based on a signal received from eNB1, reading/retrieving the measurement from another device, e.g., UE1 can read/retrieve the first timing measurement from eNB1, calculating the measurement, receiving via higher or lower layer signaling or cross layer communication from another device.
2. Obtaining at least one second timing measurement,
    In some example embodiments, the second timing measurement may be obtained by carrying out one or more of: Performing the measurement, e.g., UE1 measures based on a signal received from UE2, reading/retrieving from another device, e.g., UE2 measures based on a signal received from eNB2 or vice versa, and the second timing measurement is communicated to UE1, calculating, receiving via higher or lower layer signaling or cross layer communication from another device.

3. (Optional) obtaining additional information,
   The additional information may be obtained by carrying out one or more of: Performing the measurement, reading/retrieving from another device, calculating, receiving via higher or lower layer signaling or cross layer communication from another device.
4. Adapting the transmit configuration, for example the transmit power of UE1, based on the obtained first and second measurements and optionally the obtained additional information and using the adapted transmit power level to transmit at least one D2D-related radio signal or channel.
   In some example embodiments, the adaptation may comprise an increase or decrease in a transmit power level of UE1 with respect to the current level or a reference power level, e.g., a reduction with respect to the maximum transmit power level. The amount of the transmit power change (delta) may be pre-defined, configurable in the node, e.g., UE1, performing the adaptation, signaled by another node, e.g., UE2 and/or a network node, or autonomously decided by the node performing the adaptation, e.g., UE1.
   More generally, the adaptation result may be presented as a function of at least the first timing measurement and one or more second measurements, based on the equation below:

$$\text{TxPowerAdaptationResult} = f(\text{TimingMeasurement1}, \text{TimingMeasurement2}a, [\text{TimingMeasurement2}b, \ldots], [\text{Additional Information}])$$

5. (Optional) Signaling or forwarding of the adapted transmit power level information or at least a part of it, such as by the UE1 or by the other node, e.g., the node performing the adaptation, to another network node, to UE1 or to another UE.
   In one example embodiment, if the adaption is performed in a node different from UE1, then the transmit power adaptation result may be provided to the UE1 via a physical channel or via higher layers, such as in a message or a command.
   In another example embodiment, the adapted transmit power result may be provided to a neighbor radio network node, e.g., to a neighbor eNodeB at handover or for RRM purpose.
   In yet another example embodiment, the adapted transmit power is signaled by the controlling node to UE1 or its serving eNodeB.
   In yet another example embodiment, UE1 signals the data comprising at least a part of the adaptation result to its serving eNodeB, a controlling node, or another one or more UEs, e.g., in a broadcast message or sending an indicator indicating the adapted transmit power setting via a physical channel.

The adaptation may be performed more than once for the same UE1, with or without a feedback, e.g., from UE2, related to the previous adaptation result.

In an example embodiment, the adaptation may be performed periodically, upon a triggering event (e.g., initiating a D2D transmission, at a handover or PCell change) or a condition (e.g., when the first timing measurement changes by more than a first threshold and/or when the second timing measurement changes by more than a second threshold), upon a request or an indication from another node.

The first and the second radio network nodes, e.g., eNB1 and eNB2, may be the same or different. The steps may be implemented in the same one node, such as a UE or a network node, or over several different nodes.

The adaptation of the transmit configuration may be semi-static or dynamic. In some further example embodiments, the adaptation is based on one or more of following nine method steps and/or operations:

1) A pre-defined rule, e.g., based on a standard, or a table.
   In an example embodiment, the adaptation can be based on a comparison of the timing measurements. The timing measurements may be provided as inputs values to a defined formula and/or to select among values in table to output an adaptation value that is used to adapt the transmit configuration.
2) Comparison of the first timing measurement to a threshold.
   In an example embodiment, the first timing measurement can be compared to a first threshold value to select between two or more defined transmit power levels. The first threshold value may be defined based on a maximum transmit power of UE1.
3) Comparison of the second timing measurement to a threshold.
   In an example embodiment, the first timing measurement can be compared to a second threshold value to select between two or more defined transmit power levels. The second threshold value may be defined based on a maximum transmit power of UE2.
4) Comparison of the first timing measurement and the second timing measurement to each other.
5) Comparison of the difference between the first timing measurement and the second timing measurement to a threshold.
   In an example embodiment, when a difference between the first and second timing measurements is less than a threshold value the UE1 and UE2 may be determined to be within a same cell or cell portion and the transmit configuration of UE1 can be set based on its close proximity to UE2, e.g., transmit power of UE1 can be set to a lower level than if the difference between the first and second timing measurements is greater than the threshold value.
6) Comparison of the first radio network node and the second radio network node identifications, e.g., to determine whether they are the same or different, neighbors or not.
   In an example embodiment, UE1 can contain information defining radio network node neighbor associations, e.g., which radio network nodes have adjacent cells. Accordingly, UE1 can determine based on the identifications for the radio network node serving UE1 and UE2 how relatively close it is to UE2.
7) Comparison of a first cell, e.g., serving cell, camping cell, cell providing coverage, associated with the radio network node and a second cell associated with the second radio network node, e.g., to determine whether they are the same or different, neighbors or not.
8) Comparison of a first cell portion, e.g., a cell portion is indicative of UE location within the cell, associated with the first radio network node and a second cell portion associated with the second radio network node, e.g., to determine whether they are the same or different, neighbors or not.
   In an example embodiment, in the same cell and same cell portion, UEs with the same or similar, e.g., within a threshold, timing measurement are likely to be close to each other and thus a transmitting UE1 may not need to transmit at the maximum transmit power level but may reduce its transmit power by a delta, e.g., pre-defined or configurable.

9) Using a function of the first and the at least one second timing measurements.

In an example embodiment, one transmit power level can be determined based on the first timing measurement and another transmit power level can be determined based on the second timing measurement, and a greater one of the transmit power levels can be selected for use to control the transmit power level of UE1. This approach may be selected for use when more than a threshold difference is identified between the first and second timing measurements.

Some example operations and methods that may be performed for a timing measurement can include one or more of: timing advance (TA), time of arrival, propagation delay, UE Rx-Tx, eNodeB Rx-Tx, and round trip time (RTT).

The first timing measurement is reflecting the distance between UE1 and the first radio network node, the second timing measurement is reflecting the distance between UE2 and the second radio network node.

Some examples of the additional information that can be used to adapt the transmit configuration of a UE can include one or more of the following:

1) Node and/or cell identification, e.g., PCI, of the cell serving UE1.
2) Node or cell identification, e.g., PCI, of the cell serving UE2. This is because e.g. two cells of different neighbor eNodeBs may or may not be direct neighbors to each other.
    In an example embodiment, the transmit power level of UE1 is adapted based on the node or cell identifications indicating whether UE1 and UE2 are served by a same radio network node, served by adjacent radio network nodes, served by different radio network nodes having a known relative geographic spacing, located within a same cell, located within adjacent cells, located in different cells having a known relative geographic spacing, etc.
3) Data or an index describing a cell portion associated with UE1, within the cell of UE1.
4) Data or an index describing a cell portion associated with UE2, within the cell of UE2.
    In an example embodiment, the transmit power level of UE1 is adapted based on data or an index indicating whether UE1 and UE2 are located in a same cell portion, located within adjacent cell portions, located in different cells portions having a known relative geographic spacing, etc.
5) Data or an index describing a geographical area, e.g., a local area, indicative of the location of UE1,
6) Data or an index describing a geographical area, e.g., a local area, indicative of the location of UE2,
    In an example embodiment, the transmit power level of UE1 is adapted based on data or an index indicating geographic areas of UE1 and UE2 and determination of a relative geographic spacing therebetween.
7) Another radio measurement, e.g., a direction measurement such as angle of arrival, received signal power, received signal quality, for UE1 performed by UE1 and/or first radio network node.
8) Another radio measurement, e.g., a direction measurement such as angle of arrival, received signal power, received signal quality, for UE2 performed by UE2 and/or second radio network node.
9) Inter-site distance or cell range, e.g., a UE with TA corresponding to 500 m with respect to eNodeB1 with cell sizes of ~3 km is likely to be far away from a UE with TA corresponding to 100 m with respect to eNodeB2 with cell sizes of ~3 km.
10) A feedback from a UE2, e.g., channel quality measurement by UE2, receiving a signal/channel from UE1 transmitted at a maximum output power level or at an adapted level. The feedback from UE2 can be received and used to perform an initial adaption of UE1's transmit configuration for initial communication with UE2, and/or the feedback from UE2 can be received and used to adapt UE1's transmissions during ongoing communications with UE2.

Figure 11:
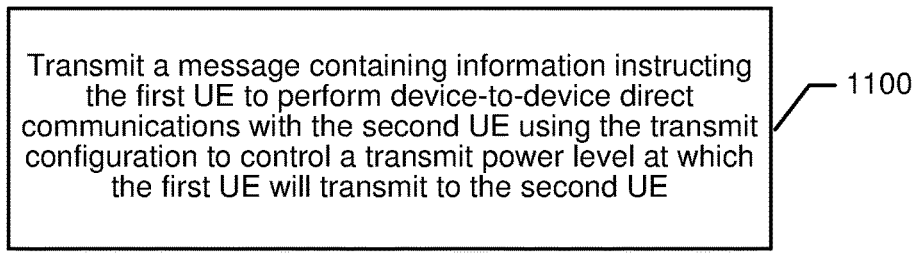

Various different components of the system may be used to perform measurements used to adapt the transmit configuration and/or to perform adaptation of the transmit configuration according to one or more of the following embodiments:

1. The Transmit Configuration Adaption is Performed in UE1:
    UE1 may perform the first radio measurement, e.g., UE Rx-Tx or TA, or may receive it from the first radio network node, e.g., eNodeB Rx-Tx or TA.
    UE1 may receive the second timing measurement, e.g. TA, for UE2 from UE2, e.g., via broadcast/multicast/unicast, from the second radio network node, e.g., eNB2, or from another node, e.g., coordinating node.
2. The Transmit Configuration Adaption is Performed in another UE:
    Another UE different from UE1, e.g., UE2 or another UE, may perform the adaptation and instruct UE1 to use the adapted transmit power level. The adaptation result may be signaled to UE2 directly or via at least eNB1.
3. The Transmit Configuration Adaption is Performed in the First Radio Network Node or Controlling Node:
    The first timing measurement in this example embodiment, may be performed by the first radio network node or UE1, e.g., which may in turn report the measurement to the first radio network node, or received from UE1. The first radio network node or the controlling node may perform the adaptation and the adapted transmit power level may be signaled to UE1 or another network node.
    Referring to the flowchart of FIG. 11, a network node can transmit (block 1100) a message containing information instructing a first UE (UE1) to perform device-to-device direct communications with a second UE (UE2) using the transmit configuration to control a transmit power level at which the first UE (UE1) will transmit to the second UE (UE2). For example, the transmit configuration may be communicated in a message from the first network node to UE1 and/or from the second network node to the UE1 via the first network node.
4. The Transmit Configuration Adaption is Performed in UE1 for a Transmission in Response to a Received Transmission from UE2:
    In this example embodiment, UE1 receives one or more transmissions from UE2 and adapts its transmit power responsive to at least one of the received transmissions.
    In a further example embodiment, the one or more transmissions comprise a control information transmitted (broadcast/groupcast/unicast) by UE2 comprising the second timing measurement, e.g., timing advance of UE2 with respect to the second radio network node.
    In another example embodiment, the one or more transmissions comprise: (1) a control information transmitted, e.g. broadcasted, groupcasted or unicasted, by UE2 comprising the second timing measurement, e.g., timing advance of UE2 with respect to the second radio network node, and (2) a data transmission, e.g., a broadcast transmission. The UE1 will then transmit in response to the received data transmission at a transmit power adapted to the second timing measurement.

Methods of Adapting Transmit Resource Allocation for D2D UE Based on Timing Measurements The principle described above under "Methods and Operations of Adapting Transmit Power of D2D UE Based on Timing Measurements" of determining the proximity of UE1 and UE2 based at least on the first and the second timing measurements (and possibly also the optional additional information) associated with the first and the second radio network nodes, respectively, may be applied in general for adapting a configuration, including, e.g. one or more of:

1) Transmit power control and/or power adaptation,
2) Transmit resource allocation/adaptation, e.g., resource allocation scheme 1 or resource allocation method 1 when UE1 and UE2 are determined to be close to each other, based on the embodiments above, otherwise resource allocation scheme 2 or resource allocation method 2,
3) Transmit mode selection/adaptation, and
4) Transmit antenna configuration selection/adaptation, e.g., selecting antenna type, antenna index or a set of tx antennas for a multi-antenna transmission, antenna beam configuration or antenna radiation pattern, antenna direction, antenna switching configuration.

Further operations and methods according to some embodiments can include the steps of:

1) Obtaining the first timing measurement, e.g.,
    a. By doing one or more of: Performing the measurement, reading/retrieving, calculating, receiving via higher or lower layer signaling or cross layer communication,
2) Obtaining at least one second timing measurement, e.g.;
    a. By doing one or more of: Performing the measurement, reading/retrieving, calculating, receiving via higher or lower layer signaling or cross layer communication,
3) (Optional) obtaining additional information, e.g.,
    a. By doing one or more of: Performing the measurement, reading/retrieving, calculating, receiving via higher or lower layer signaling or cross layer communication,
4) Adapting transmit configuration, e.g., resource allocation scheme, resource allocation method, transmit mode, and/or transmit antenna; and
5) (Optional) Signaling or forwarding of the adapted transmit configuration or at least a part of it, e.g., by the UE1 or by the other node, e.g., the node performing the adaptation, to another network node, to UE1 or to another UE.

Summary of Above-Disclosed Embodiments by a Network Node

Figure 12:
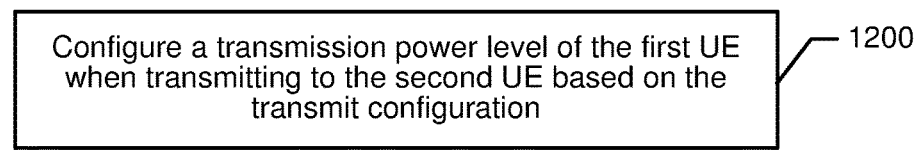

Referring to the embodiment of FIG. 12, which illustrates a further embodiment of FIG. 10 explained above, the first network node (eNB1) adapts the transmit configuration of the first UE (UE1) for communications directly to a second UE (UE2), by configuring (block 1200) a transmission power level of the first UE (UE1) when transmitting to the second UE (UE2) based on the transmit configuration.

Figure 13:
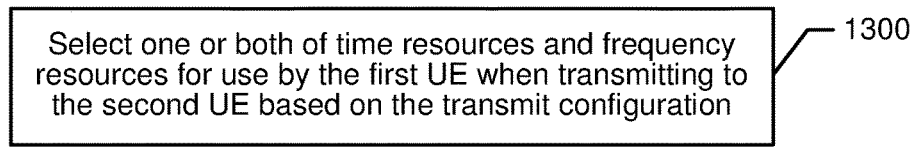

The transmit configuration is not limited to transmit power level. In some other embodiments, the transmit configuration may alternatively or additionally include time resources and frequency resources for transmitting. Referring to the embodiment of FIG. 13, the first network node (eNB1) adapts the transmit configuration of the first UE (UE1) by selecting (block 1300) one or both of time resources and frequency resources for use by the first UE (UE1) when transmitting directed to the second UE (UE2) based on the transmit configuration.

Figure 14:
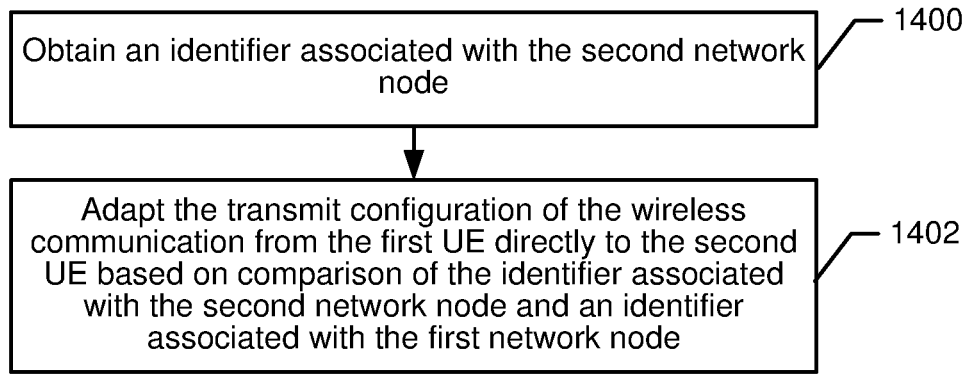

Referring to the embodiment of FIG. 14, the first network node (eNB1) obtains (block 1400) an identifier associated with the second network node (eNB2), and adapts (block 1402) the transmit configuration of the wireless communication from the first UE (UE1) directly to the second UE (UE2) based on comparison of the identifier associated with the second network node (eNB2) and an identifier associated with the first network node (eNB1). The identifiers associated with the first and second network nodes can be any of: an identifier of the respective network node, identity of a cell associated with the respective network node, or identifier of a cell portion associated with the respective network node.

Summary of Above-Disclosed Embodiments by a Network Node and/or a UE

Figure 15:
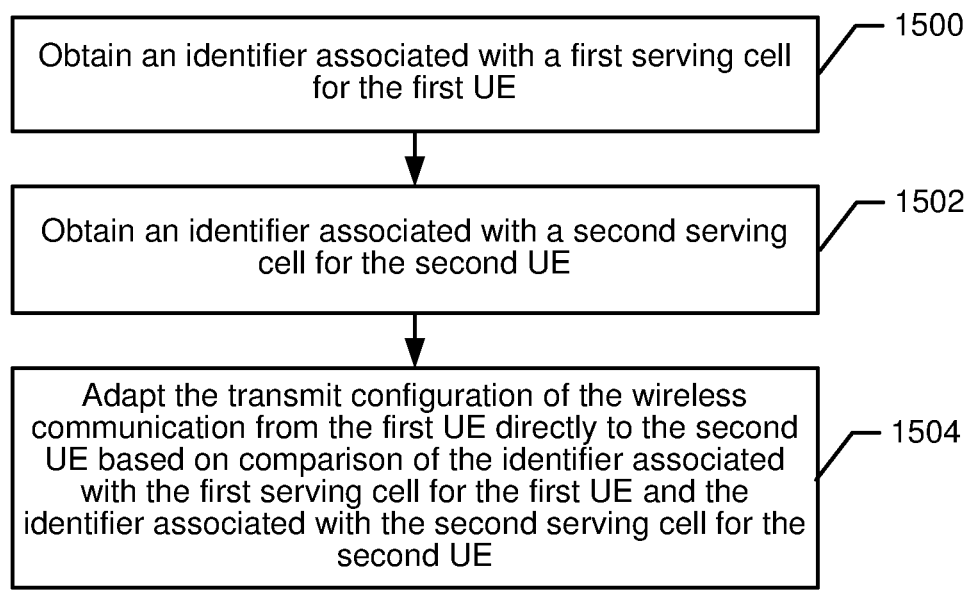
FIGS. 15-18 illustrate operations and methods that can be performed by a network node and/or by a UE to adapt a transmit configuration used for D2D operation between UEs according to some embodiments.

Referring to the embodiment of FIG. 15, the first network node (eNB1) and/or the first UE (UE1) obtains an identifier associated with a first serving cell for the first UE (UE1), and obtains (block 1502) an identifier associated with a second serving cell for the second UE (UE2). The first network node (eNB1) and/or the first UE (UE1) adapts (block 1504) the transmit configuration of the wireless communication from the first UE (UE1) directly to the second UE (UE2) based on comparison of the identifier associated with the first serving cell for the first UE (UE1) and the identifier associated with the second serving cell for the second UE (UE2). The identifiers associated with the first and second network nodes (eNB1, eNB2) can be any of: an identifier of the respective network node, identity of a cell associated with the respective network node, or identifier of a cell portion associated with the respective network node. In a further embodiment, the identifiers associated with the first and second network nodes are an identity of a cell associated with the respective network node or identifier of a cell portion associated with the respective network node.

Figure 16:
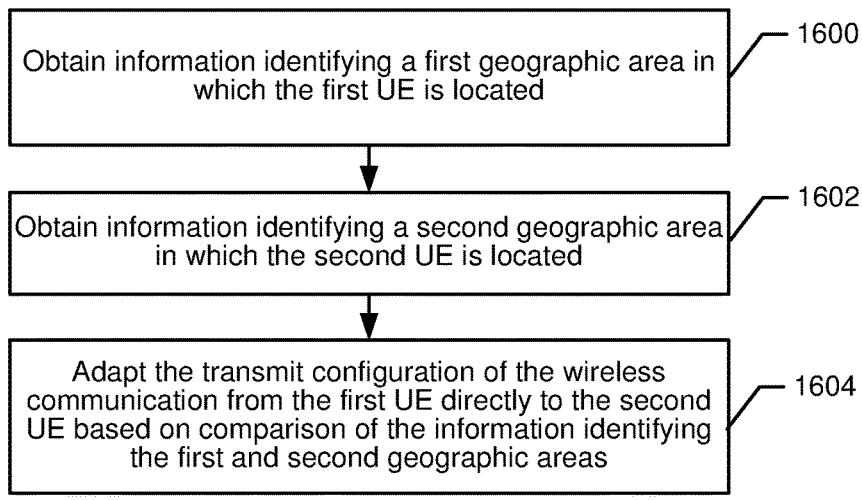

Referring to the embodiment of FIG. 16, the first network node (eNB1) and/or the first UE (UE1) obtains (block 1600) information identifying a first geographic area in which the first UE (UE1) is located, and obtains (block 1602) information identifying a second geographic area in which the second UE (UE2) is located. The first network node (eNB1) and/or the first UE (UE1) adapts (block 1604) the transmit configuration of the wireless communication from the first UE (UE1) directly to the second UE (UE2) based on comparison of information identifying the first and second geographic areas.

Figure 17:
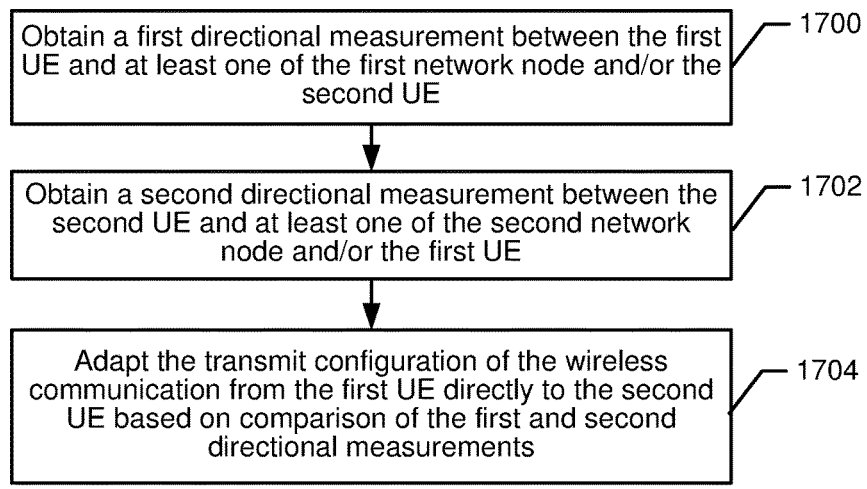

Referring to the embodiment of FIG. 17, the first network node (eNB1) and/or the first UE (UE1) obtains (block 1700) a first directional measurement between the first UE (UE1) and at least one of the first network node (eNB1) and/or the second UE (UE2), and obtains (block 1702) a second directional measurement between the second UE (UE2) and at least one of the second network node (eNB2) and/or the first UE (UE1). The first network node (eNB1) and/or the first UE (UE1) adapts (block 1704) the transmit configuration of the wireless communication from the first UE (UE1) directly to the second UE (UE2) based on comparison of the first and second directional measurements.

Figure 18:
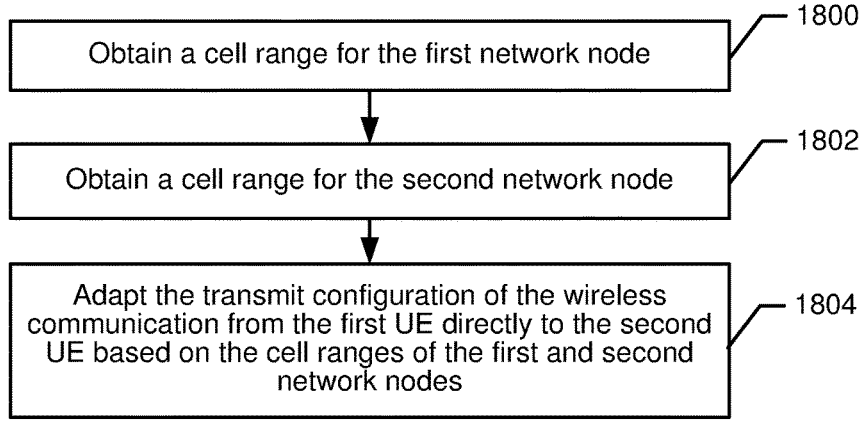

Referring to the embodiment of FIG. 18, the first network node (eNB1) and/or the first UE (UE1) obtains (block 1800) a cell range for the first network node (eNB1), and obtains (block 1802) a cell range for the second network node (eNB2). The first network node (eNB1) and/or the first UE (UE1) adapts (block 1804) the transmit configuration of the wireless communication from the first UE (UE1) directly to the second UE (UE2) based on the cell ranges of the first and second network nodes (eNB1, eNB2).

Summary of Above-Disclosed Embodiments by a UE

Figure 20:
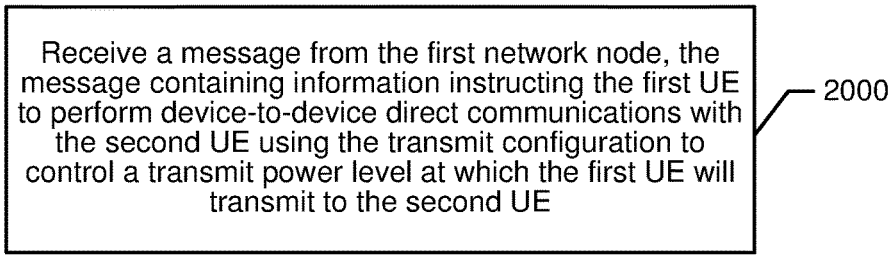

Referring to the embodiment of FIG. 20, which illustrates a further embodiment of FIG. 19 explained above, the first UE (UE1) receives (block 2000) a message from the first network node (eNB1), where the message contains information instructing the first UE (UE1) to perform device-to-device direct communications with the second UE (UE2) using the transmit configuration to control a transmit power level at which the first UE (UE1) will transmit to the second UE (UE2).

The first UE (UE1) may obtain (block 1900) the first timing measurement by at least one of: obtaining a timing advance value, a transmission propagation delay from the first UE (UE1) to the first network node (eNB1), a transmission propagation time from the first network node (eNB1) to the first UE (UE1), a round-trip transmission propagation delay, and a time of arrival measurement.

Figure 21:
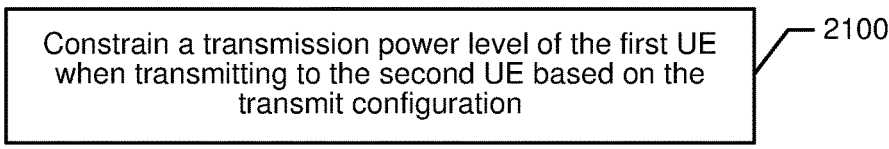

Referring to the embodiment of FIG. 21, the first UE (UE1) performs adaptation of the transmit configuration (block 1904 of FIG. 19) by constraining (block 2100) a transmission power level of the first UE (UE1) when transmitting to the second UE (UE2) based on the transmit configuration.

Figure 22:
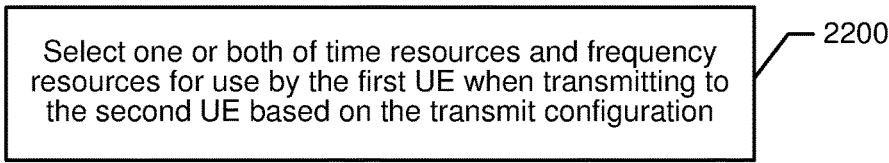

The transmit configuration is not limited to transmit power level. In some other embodiments, the transmit configuration may alternatively or additionally include time resources and frequency resources for transmitting. Referring to the embodiment of FIG. 22, the first UE (UE1) performs adaptation of the transmit configuration (block 1904 of FIG. 19) by selecting (block 2200) one or both of time resources and frequency resources for use by the first UE (UE1) when transmitting to the second UE (UE2) based on the transmit configuration.

Figure 23:
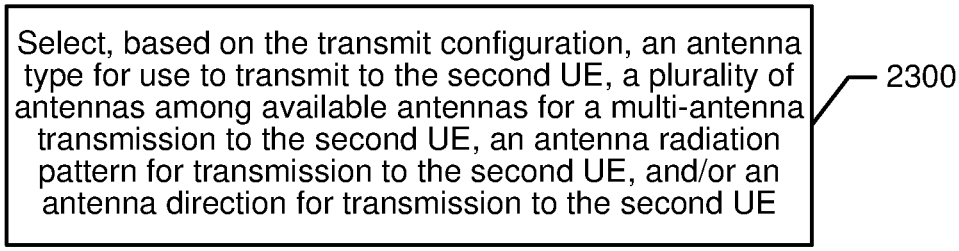

Referring to the embodiment of FIG. 23, the first UE (UE1) performs adaptation of the transmit configuration (block 1904 of FIG. 19) by selecting (block 2300), based on the transmit configuration, an antenna type for use to transmit to the second UE (UE2), a plurality of antennas among available antennas for a multi-antenna transmission to the second UE (UE2), an antenna radiation pattern for transmission to the second UE (UE2), and/or an antenna direction for transmission to the second UE (UE2).

Figure 24:
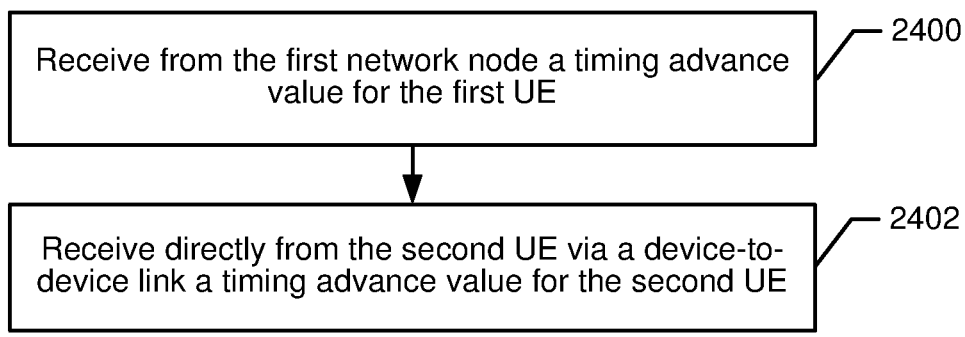

Referring to the embodiment of FIG. 24, the first UE (UE1) performs the obtaining of the first timing measurement (block 1900 of FIG. 19) by receiving (block 2400) from the first network node (eNB1) a timing advance value for the first UE (UE1). The first UE (UE1) further performs the obtaining of the second timing measurement (block 1902 of FIG. 19) by receiving (block 2402) directly from the second UE (UE2) via a device-to-device link a timing advance value for the second UE (UE2).

Figure 25:
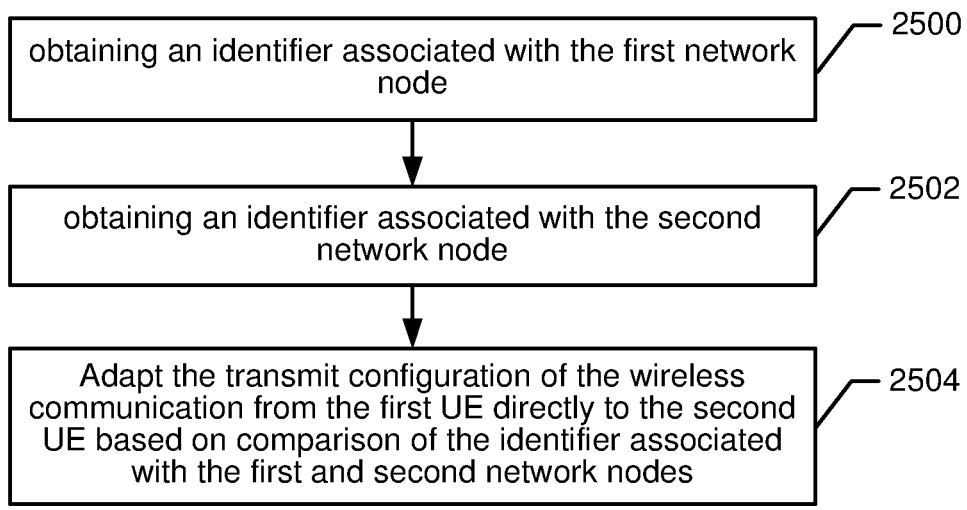

Referring to the embodiment of FIG. 25, the first UE (UE1) further obtains (block 2500) an identifier associated with the first network node (eNB1) and obtains (block 2502) an identifier associated with the second network node (eNB2). The identifiers associated with the first and second network nodes (eNB1, eNB2) are any of: an identifier of the respective network node, identity of a cell associated with the respective network node, or identifier of a cell portion associated with the respective network node. The first UE (UE1) then performs adaptation of the transmit configuration (block 1904 of FIG. 19) based on comparison of the identifier associated with the first and second network nodes (eNB1, eNB2).

Figure 26:
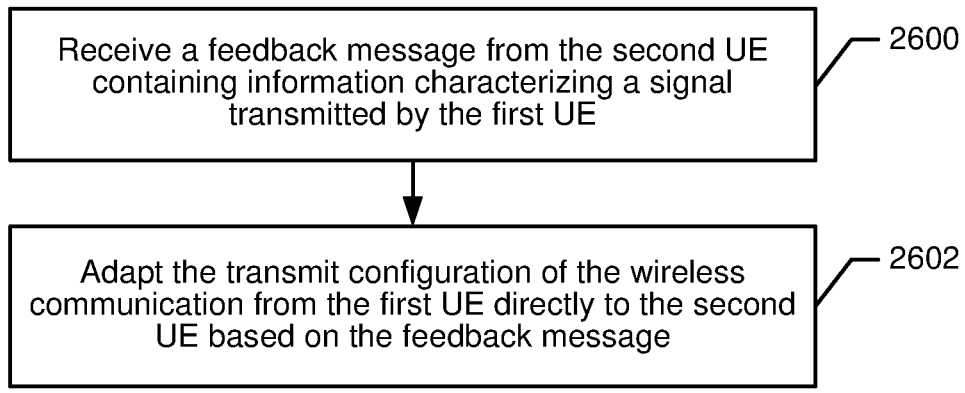
Figure 27:
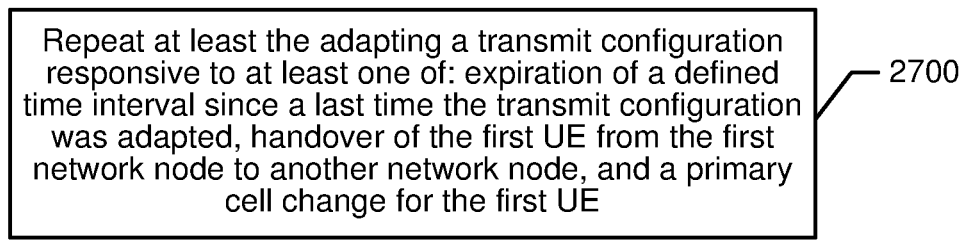
Figure 28:
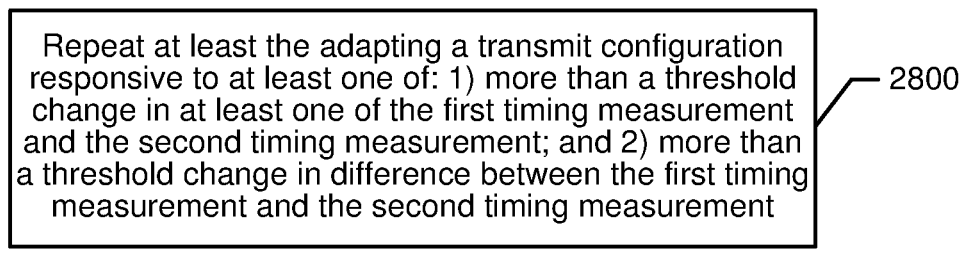

Referring to the embodiment of FIG. 26, the first UE (UE1) further receives (block 2600) a feedback message from the second UE (UE2) containing information characterizing a signal transmitted by the first UE (UE1), and adapts (block 2602) the transmit configuration of the wireless communication from the first UE (UE1) directly to the second UE (UE2) based on the feedback message.

Referring to the embodiment of FIG. 26, the first UE (UE1) repeats (block 2700) at least the step of adapting a transmit configuration responsive to at least one of: expiration of a defined time interval since a last time the transmit configuration was adapted, handover of the first UE (UE1) from the first network node (eNB1) to another network node, and a primary cell change for the first UE (UE1).

Referring to the embodiment of FIG. 26, the first UE (UE1) repeats (block 2800) at least the step of adapting a transmit configuration responsive to at least one of: 1) more than a threshold change occurring in at least one of the first timing measurement and the second timing measurement; and 2) more than a threshold change occurring in the difference between the first timing measurement and the second timing measurement.

Figure 29:
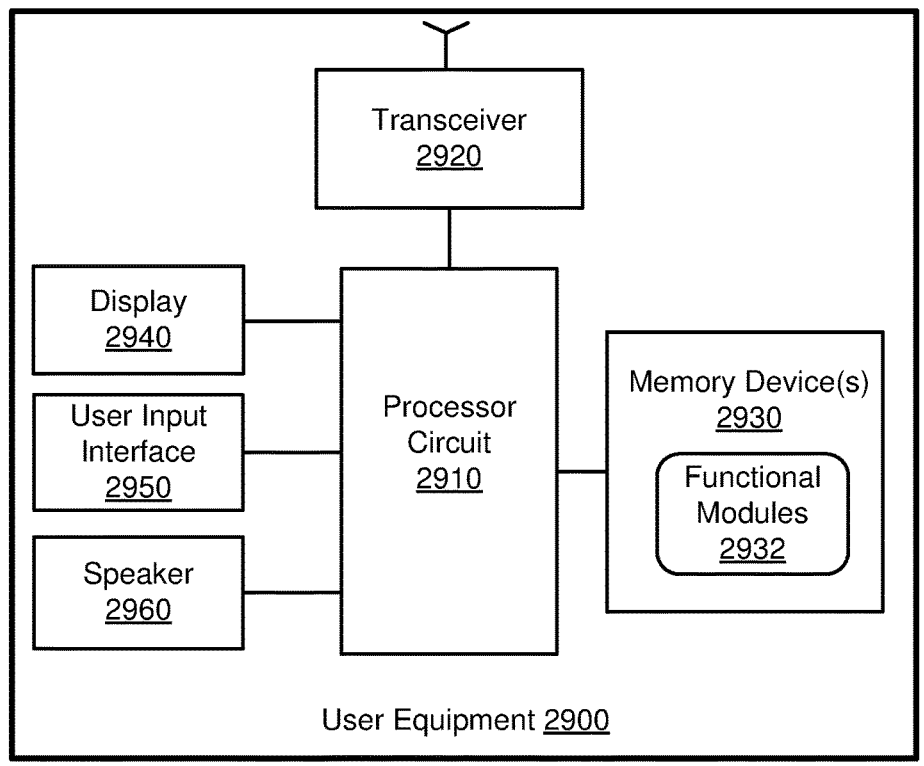
FIG. 29 illustrates a UE that may be configured to operate according to one or more embodiments disclosed herein.

Example User Equipment:

FIG. 29 is a block diagram of a user equipment (UE) device 2900 that is configured according to one or more embodiments disclosed herein for a UE, e.g., UE1, UE2, UE3, etc. The UE 2900 includes a transceiver 2920, a processor circuit(s) 2910, and a memory device(s) 2930 containing functional modules 2932. The UE 2900 may further include a display 2940, a user input interface 2950, and a speaker 2960.

The transceiver 2920 is configured to communicate with a network node through a wireless air interface using one or more of the radio access technologies disclosed herein. The processor circuit 2910 may include one or more data processing circuits, such as a general purpose and/or special purpose processor, e.g., microprocessor and/or digital signal processor. The processor circuit 2920 is configured to execute computer program instructions from the functional modules 2932 of the memory device(s) 2930 to perform at least some of the operations and methods described herein as being performed by a UE, e.g., UE1, UE2, UE3, etc.

Figure 30:
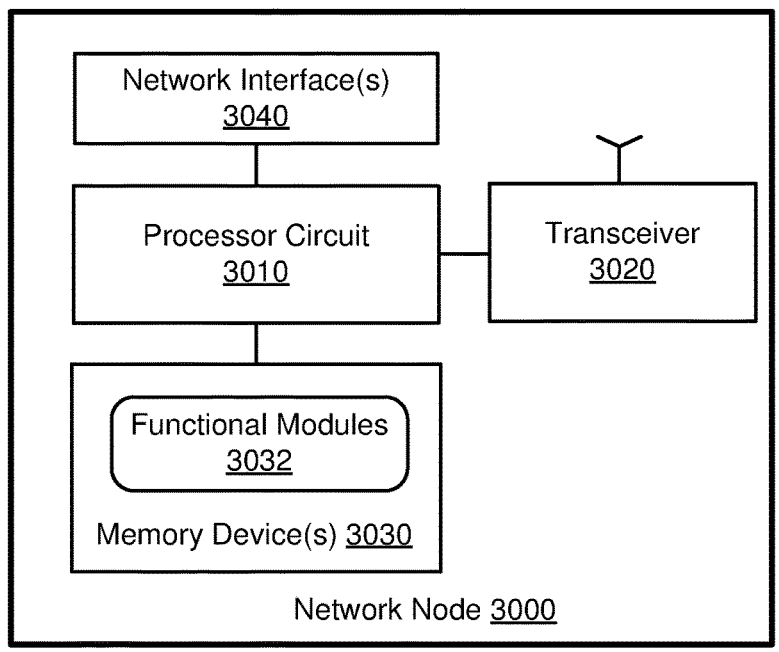
FIG. 30 illustrates a network node that may be configured to operate according to one or more embodiments disclosed herein.

Example Network Node:

FIG. 30 is a block diagram of a network node 3000 that is configured according to one or more embodiments disclosed herein for a radio network node or other network node. The network node 3000 includes a transceiver 3020, a network interface(s) 3040, a processor circuit 3010, and a memory device(s) 3030 containing functional modules 3032.

The transceiver 3020 is configured to communicate with the UE 2920 using one or more of the radio access technologies disclosed herein. The processor circuit 3010 may include one or more data processing circuits, such as a general purpose and/or special purpose processor, e.g., microprocessor and/or digital signal processor, that may be collocated or distributed across one or more networks. The processor circuit 3010 is configured to execute computer program instructions from the functional modules 3032 of the memory device(s) 3030 to perform at least some of the operations and methods of described herein as being performed by a network node. The network interface 3040 communicates with other network nodes and/or a core network.

Further Definitions and Embodiments

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When a node is referred to as being "connected", "coupled", "responsive", or variants thereof to another node, it can be directly connected, coupled, or responsive to the other node or intervening nodes may be present. In contrast, when an node is referred to as being "directly connected", "directly coupled", "directly responsive", or variants thereof to another node, there are no intervening nodes present. Like numbers refer to like nodes throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A method by a first network node for adapting transmit configuration of a first user equipment, UE, for communications directly to a second UE, the method comprising:
obtaining a first timing measurement between the first UE and the first network node;
obtaining a second timing measurement between the second UE and a second network node;
adapting the transmit configuration that includes a transmit power level of a wireless communication from the first UE directly to the second UE based on the first timing measurement between the first UE and the first network node and the second timing measurement between the second UE and the second network node; and
transmitting a message containing information instructing the first UE to perform device-to-device direct communications with the second UE using the transmit configuration to control the transmit power level at which the first UE will transmit to the second UE.

2. The method of claim 1, further comprising transmitting the message comprising the transmit configuration to another network node.

3. The method of claim 1, wherein obtaining the first timing measurement comprises at least one of:
obtaining a timing advance value, a transmission propagation time from the first UE to the first network node, a transmission propagation delay from the first network node to the first UE, a round-trip transmission propagation delay, and a time of arrival measurement.

4. The method of claim 1, wherein adapting the transmit configuration of a wireless communication from the first UE to the second UE, comprises:
configuring a transmission power level of the first UE when transmitting to the second UE based on the transmit configuration.

5. The method of claim 1, wherein adapting the transmit configuration of a wireless communication from the first UE to the second UE, comprises:
selecting one or both of time resources and frequency resources for use by the first UE when transmitting to the second UE based on the transmit configuration.

6. The method of claim 1, further comprising:
obtaining an identifier associated with the second network node; and
adapting the transmit configuration of the wireless communication from the first UE directly to the second UE based on comparison of the identifier associated with the second network node and an identifier associated with the first network node,
wherein the identifiers associated with the first and second network nodes are any of: an identifier of the respective network node, identity of a cell associated with the respective network node, or identifier of a cell portion associated with the respective network node.

7. The method of claim 1, further comprising:
obtaining an identifier associated with a first serving cell for the first UE;
obtaining an identifier associated with a second serving cell for the second UE; and
adapting the transmit configuration of the wireless communication from the first UE directly to the second UE based on comparison of the identifier associated with the first serving cell for the first UE and the identifier associated with the second serving cell for the second UE,
wherein the identifiers associated with the first and second network nodes are any of: an identifier of the respective network node, identity of a cell associated with the respective network node, or identifier of a cell portion associated with the respective network node.

8. The method of claim 7, wherein:
the identifiers associated with the first and second network nodes are an identity of a cell associated with the respective network node or identifier of a cell portion associated with the respective network node.

9. The method of claim 1, further comprising:
obtaining information identifying a first geographic area in which the first UE is located;
obtaining information identifying a second geographic area in which the second UE is located; and
adapting the transmit configuration of the wireless communication from the first UE directly to the second UE based on comparison of information identifying the first and second geographic areas.

10. The method of claim 1, further comprising:
obtaining a first directional measurement between the first UE and at least one of the first network node and/or the second UE;
obtaining a second directional measurement between the second UE and at least one of the second network node and/or the first UE; and
adapting the transmit configuration of the wireless communication from the first UE directly to the second UE based on comparison of the first and second directional measurements.

11. The method of claim 1, further comprising:
obtaining a cell range for the first network node;
obtaining a cell range for the second network node; and
adapting the transmit configuration of the wireless communication from the first UE directly to the second UE based on the cell ranges of the first and second network nodes.

12. A method by a first user equipment, UE, for adapting a transmit configuration for communications directly to a second UE, comprising:
obtaining a first timing measurement between the first UE and a first network node;
obtaining a second timing measurement between a second UE and a second network node;
adapting the transmit configuration that includes a transmit power level of a wireless communication from the first UE directly to the second UE based on the first timing measurement between the first UE and the first network node and the second timing measurement between the second UE and the second network node; and
receiving a message from the first network node, the message containing information instructing the first UE to perform device-to-device direct communications with the second UE using the transmit configuration to control the transmit power level at which the first UE will transmit to the second UE.

13. The method of claim 12, wherein obtaining the first timing measurement comprises at least one of:
obtaining a timing advance value, a transmission propagation delay from the first UE to the first network node, a transmission propagation time from the first network node to the first UE, a round-trip transmission propagation delay, and a time of arrival measurement.

14. The method of claim 12, wherein adapting the transmit configuration of a wireless communication from the first UE to the second UE, comprises:

constraining a transmission power level of the first UE when transmitting to the second UE based on the transmit configuration.

15. The method of claim 12, wherein adapting the transmit configuration of a wireless communication from the first UE to the second UE, comprises:
selecting one or both of time resources and frequency resources for use by the first UE when transmitting to the second UE based on the transmit configuration.

16. The method of claim 12, wherein adapting the transmit configuration of a wireless communication from the first UE to the second UE, comprises:
selecting, based on the transmit configuration, an antenna type for use to transmit to the second UE, a plurality of antennas among available antennas for a multi-antenna transmission to the second UE, an antenna radiation pattern for transmission to the second UE, and/or an antenna direction for transmission to the second UE.

17. The method of claim 12, wherein:
obtaining the first timing measurement comprises receiving from the first network node a timing advance value for the first UE; and
obtaining the second timing measurement comprises receiving directly from the second UE via a device-to-device link a timing advance value for the second UE.

18. The method of claim 12, further comprising:
obtaining an identifier associated with the first network node;
obtaining an identifier associated with the second network node; and
adapting the transmit configuration of the wireless communication from the first UE directly to the second UE based on comparison of the identifier associated with the first and second network nodes,
wherein the identifiers associated with the first and second network nodes are any of: an identifier of the respective network node, identity of a cell associated with the respective network node, or identifier of a cell portion associated with the respective network node.

19. The method of claim 12, further comprising:
obtaining an identifier associated with a first serving cell for the first UE;
obtaining an identifier associated with a second serving cell for the second UE; and
adapting the transmit configuration of the wireless communication from the first UE directly to the second UE based on comparison of the identifier associated with the first serving cell for the first UE and the identifier associated with the second serving cell for the second UE,
wherein the identifiers associated with the first and second network nodes are any of: an identifier of the respective network node, identity of a cell associated with the respective network node, or identifier of a cell portion associated with the respective network node.

20. The method of claim 19, wherein:
the identifiers associated with the first and second network nodes are an identity of a cell associated with the respective network node or identifier of a cell portion associated with the respective network node.

21. The method of claim 12, further comprising:
obtaining information identifying a first geographic area in which the first UE is located;
obtaining information identifying a second geographic area in which the second UE is located; and
adapting the transmit configuration of the wireless communication from the first UE directly to the second UE based on comparison of information identifying the first and second geographic areas.

22. The method of claim 12, further comprising:
obtaining a first directional measurement between the first UE and at least one of the first network node and/or the second UE;
obtaining a second directional measurement between the second UE and at least one of the second network node and/or the first UE; and
adapting the transmit configuration of the wireless communication from the first UE directly to the second UE based on comparison of the first and second directional measurements.

23. The method of claim 12, further comprising:
obtaining a cell range for the first network node;
obtaining a cell range for the second network node; and
adapting the transmit configuration of the wireless communication from the first UE directly to the second UE based on the cell ranges of the first and second network nodes.

24. The method of claim 12, further comprising:
receiving a feedback message from the second UE containing information characterizing a signal transmitted by the first UE; and
adapting the transmit configuration of the wireless communication from the first UE directly to the second UE based on the feedback message.

25. The method of claim 12, further comprising:
repeating at least the adapting a transmit configuration responsive to at least one of: expiration of a defined time interval since a last time the transmit configuration was adapted, handover of the first UE from the first network node to another network node, and a primary cell change for the first UE.

26. The method of claim 12, further comprising:
repeating at least the adapting a transmit configuration responsive to at least one of: 1) more than a threshold change in at least one of the first timing measurement and the second timing measurement; and 2) more than a threshold change in difference between the first timing measurement and the second timing measurement.

27. A first network node for adapting a transmit configuration of a first user equipment, UE, for communications directly to a second UE, the first network node comprising:
a processor; and
a memory coupled to the processor and comprising computer readable program code that when executed by the processor causes the processor to perform operations comprising:
obtaining a first timing measurement between the first UE and the first network node;
obtaining a second timing measurement between the second UE and a second network node;
adapting a transmit configuration that includes a transmit power level of a wireless communication from the first UE directly to the second UE based on the first timing measurement between the first UE and the first network node and the second timing measurement between the second UE and the second network node; and
transmitting a message comprising information instructing the first UE to perform device-to-device direct communications with the second UE using the transmit configuration to control the transmit power level at which the first UE will transmit to the second UE.

28. The first network node of claim 27, wherein obtaining the first timing measurement comprises at least one of:

obtaining a timing advance value, a transmission propagation delay from the first UE to the first network node, a transmission propagation delay from the first network node to the first UE, a round-trip transmission propagation delay, and a time of arrival measurement.

29. A first user equipment, UE, for adapting a transmit configuration for communications directly to a second UE, comprising:

a processor; and a memory coupled to the processor and comprising computer readable program code that when executed by the processor causes the processor to perform operations comprising:

obtaining a first timing measurement between the first UE and a first network node;

obtaining a second timing measurement between the second UE and a second network node;

adapting a transmit configuration that includes a transmit power level of a wireless communication from the first UE directly to the second UE based on the first timing measurement between the first UE and the first network node and the second timing measurement between the second UE and the second network node; and receiving a message from the first network node, the message comprising information instructing the first UE to perform device-to-device direct communications with the second UE using the transmit configuration to control the transmit power level at which the first UE will transmit to the second UE.

30. The first UE of claim 29, wherein obtaining the first timing measurement comprises at least one of:

obtaining a timing advance value, a transmission propagation delay from the first UE to the first network node, a transmission propagation delay from the first network node to the first UE, a round-trip transmission propagation delay, and a time of arrival measurement.

* * * * *